United States Patent
Jordens et al.

(10) Patent No.: US 7,244,906 B2
(45) Date of Patent: Jul. 17, 2007

(54) ENERGY MONITORING OR CONTROL OF INDIVIDUAL VIAS FORMED DURING LASER MICROMACHINING

(75) Inventors: William J. Jordens, Beaverton, OR (US); Lindsey M. Dotson, Portland, OR (US); Mark Unrath, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 0 days.

(21) Appl. No.: 11/217,077

(22) Filed: Aug. 30, 2005

(65) Prior Publication Data

US 2007/0045253 A1  Mar. 1, 2007

(51) Int. Cl.
*B23K 26/38* (2006.01)

(52) U.S. Cl. .......................... 219/121.62; 219/121.71; 219/121.83

(58) Field of Classification Search ............. 219/121.7, 219/121.71, 121.83, 121.61, 121.62, 121.69; 700/166
See application file for complete search history.

(56) References Cited

U.S. PATENT DOCUMENTS

| | | | | |
|---|---|---|---|---|
| 4,504,727 A | * | 3/1985 | Melcher et al. ........ | 219/121.62 |
| 5,059,760 A | * | 10/1991 | Iehisa et al. ........... | 219/121.62 |
| 6,201,214 B1 | * | 3/2001 | Duffin ................... | 219/121.71 |
| 6,441,337 B1 | * | 8/2002 | Isaji et al. ............. | 219/121.83 |
| 6,804,574 B2 | * | 10/2004 | Liu et al. .................... | 700/166 |
| 6,829,517 B2 | * | 12/2004 | Cheng et al. ............... | 700/166 |
| 7,173,227 B2 | * | 2/2007 | Iwata et al. ............ | 219/121.62 |
| 2006/0243708 A1 | * | 11/2006 | Ikenoue ................. | 219/121.62 |

FOREIGN PATENT DOCUMENTS

| | | | |
|---|---|---|---|
| DE | 10256262 A1 | * | 6/2004 |
| JP | 10-85976 A | * | 4/1998 |
| WO | WO-86/02301 A1 | * | 4/1986 |

* cited by examiner

*Primary Examiner*—Geoffrey S. Evans
(74) *Attorney, Agent, or Firm*—Stoel Rives LLP

(57) ABSTRACT

A method and system increase the quality of results achieved by laser micromachining systems. Data relating to parameters controlling laser micromachining process are recorded during the micromachining process, identified by the feature associated with the parameters used to micromachine, and stored on the system. The stored data can be either retrieved during the micromachining process to enable real time control or retrieved after workpiece processing to conduct statistical process control.

11 Claims, 3 Drawing Sheets

ENERGY MONITORING OR CONTROL OF INDIVIDUAL VIAS FORMED DURING LASER MICROMACHINING

TECHNICAL FIELD

The present invention relates to laser processing a workpiece and, in particular, to monitoring the parameters of a laser used to micromachine features on a substrate. These parameters can be provided as output immediately to supply information for real time control of the micromachining process or stored for retrieval at a later time to be used for process control.

BACKGROUND OF THE INVENTION

Laser processing can be conducted on numerous different workpieces using various lasers effecting a variety of processes. The specific types of laser processing of interest with regard to the present invention are laser processing of a single or multilayer workpiece to effect hole and/or blind via formation and laser processing of a semiconductor wafer to effect wafer dicing or drilling. The laser processing methods described herein could also be applied to any type of laser micromachining, including but not limited to removal of semiconductor links (fuses) and thermal annealing or trimming passive thick or thin film components.

Regarding laser processing of vias and/or holes in a multilayer workpiece, U.S. Pat. Nos. 5,593,606 and 5,841,099 of Owen et al. describe methods of operating an ultraviolet (UV) laser system to generate laser output pulses characterized by pulse parameters set to form in a multilayer device through-hole or blind vias in two or more layers of different material types. The laser system includes a nonexcimer laser that emits, at pulse repetition rates of greater than 200 Hz, laser output pulses having temporal pulse widths of less than 100 ns, spot areas having diameters of less than 100 µm, and average intensities or irradiance of greater than 100 mW over the spot area. The preferred nonexcimer UV laser identified is a diode-pumped, solid-state (DPSS) laser.

U.S. Patent Application Publication No. US/2002/0185474 of Dunsky et al. describes a method of operating a pulsed $CO_2$ laser system to generate laser output pulses that form blind vias in a dielectric layer of a multilayer device. The laser system emits, at pulse repetition rates of greater than 200 Hz, laser output pulses having temporal pulse widths of less than 200 ns and spot areas having diameters of between 50 µm and 300 µm.

Laser removal of a target material, particularly when a UV DPSS laser is used, relies upon directing to the target material a laser output having a power, also referred to as fluence or energy density, that is greater than the removal threshold of the target material. Material removal can be effected by either a photo-chemical process, also called ablation, wherein the forces that hold atoms and molecules together are broken or by a photo-thermal process wherein the material is vaporized. A UV laser emits a laser output that can be focused to have a spot size of between about 5 µm and about 30 µm at the $1/e^2$ diameter. In certain instances, this spot size is smaller than the desired via diameter, such as when the desired via diameter is between about 50 µm and 300 µm. The diameter of the spot size can be enlarged to have the same diameter as the desired diameter of the via, but such enlargement would reduce the laser output energy density to the extent that it is less than the target material ablation threshold and cannot effect target material removal. Consequently, the 5 µm to 30 µm focused spot size is used and the focused laser output is typically moved in a spiral, concentric circular, or "trepan" pattern to form a via having the desired diameter. Spiraling, concentric circle, and trepanning processing are types of so-called non-punching via formation processes. For via diameters of about 70 µm or smaller, direct punching delivers a higher via formation throughput.

In contrast, the spot size of the output of a pulsed $CO_2$ laser is typically larger than 50 µm and is capable of maintaining an energy density sufficient to effect formation of vias having diameters of 50 µm or larger on conventional target materials. Consequently, a punching process is typically employed when a $CO_2$ laser is used to effect via formation. However, a via having a spot area diameter of less than 50 µm cannot be formed using a $CO_2$ laser.

The high degree of reflectivity of copper at the $CO_2$ wavelength makes very difficult the formation of a through-hole via using a $CO_2$ laser in a copper sheet having a thickness greater than about 5 microns. Thus $CO_2$ lasers can typically be used to form through-hole vias only in copper sheets that have thicknesses of between about 3 microns and about 5 microns or that have been surface treated to enhance the absorption of the $CO_2$ laser energy.

The most common materials used in making multilayer structures for printed circuit board (PCB) and electronic packaging devices in which vias are formed typically include metals (e.g., copper) and dielectric materials (e.g., polymer polyimide, resin, or FR-4). Laser energy at UV wavelengths exhibits good coupling efficiency with metals and dielectric materials, so the UV laser can readily effect via formation on both copper sheets and dielectric materials. Also, UV laser processing of polymer materials is widely considered to be a combined photo-chemical and photo-thermal process, in which the UV laser output partly ablates the polymer material by disassociating its molecular bonds through a photon-excited chemical reaction, thereby producing superior process quality as compared to the photo-thermal process that occurs when the dielectric materials are exposed to longer laser wavelengths. For these reasons, solid-state UV lasers are preferred laser sources for processing these materials.

$CO_2$ laser processing of dielectric and metal materials and UV laser processing of metals are primarily photo-thermal processes, in which the dielectric material or metal material absorbs the laser energy, causing the material to increase in temperature, soften or become molten, and eventually ablate, vaporize, or blow away. Ablation rate and via formation throughput are, for a given type of material, a function of laser energy density or fluence (laser energy (J) divided by spot size ($cm^2$)), power density (laser energy density divided by pulse width (seconds)), pulse width, laser wavelength, and pulse repetition rate.

Thus, laser processing throughput, such as, for example, via formation on PCB or other electronic packaging devices or hole drilling on metals or other materials, is limited by the laser power available and pulse repetition rate, as well as the speed at which the beam positioner can move the laser output in a spiral, concentric circle, or trepan pattern and between via positions. An example of a UV DPSS laser is a Model LWE Q302 (355 nm) sold by Lightwave Electronics, Mountain View, Calif. This laser is used in a Model 5330 laser system or other systems in its series manufactured by Electro-Scientific Industries, Inc., Portland, Oreg., the assignee of the present patent application. The laser is capable of delivering 8 W of UV power at a pulse repetition rate of 30 kHz. The typical via formation throughput of this laser and system is about 600 vias each second on bare resin.

An example of a pulsed $CO_2$ laser is a Model Q3000 (9.3 µm) sold by Coherent-DEOS, Bloomfield, Conn. This laser is used in a Model 5385 laser system or other systems in its series manufactured by Electro-Scientific Industries, Inc. The laser is capable of delivering 18 W of laser power at a pulse repetition rate of 60 kHz. The typical via formation throughput of this laser and system is about 1000 vias each second on bare resin and 250–300 vias each second on FR-4.

Increased via formation throughput can be accomplished by increasing the pulse repetition rate at a pulse power that is sufficient to cause ablation as described above. However, for the UV DPSS laser and the pulsed $CO_2$ laser, as pulse repetition rates increase, pulse power decreases in a non-linear fashion, i.e., twice the pulse repetition rate results in less than one-half the pulse power for each pulse. Thus for a given laser, there will be a maximum pulse repetition rate and hence maximum rate of via formation governed by the minimum pulse power needed to cause ablation.

Regarding dicing a semiconductor wafer, there are two common methods of effecting the dicing: mechanical sawing and laser dicing. Mechanical sawing typically entails using a diamond saw to dice wafers having a thickness of greater than about 150 microns to form streets having widths of greater than about 100 microns. Mechanically sawing wafers having a thickness that is less than about 100 microns results in cracking of the wafer.

Laser dicing typically entails dicing the semiconductor wafer using a pulsed IR, green, or UV laser. Laser dicing offers various advantages over mechanically sawing a semiconductor wafer, such as the ability to reduce the width of the street to about 50 microns when using a UV laser, the ability to dice a wafer along a curved trajectory, and the ability to effectively dice silicon wafers thinner than those that can be diced using mechanical sawing. For example, a silicon wafer having a thickness of about 75 microns may be diced with a DPSS UV laser operated at a power of about 8 W and a repetition rate of about 30 kHz at a dicing speed of 120 mm/sec to form a kerf having a width of about 35 microns. However, one disadvantage of laser dicing semiconductor wafers is the formation of debris and slag, both of which could adhere to the wafer and are difficult to remove. Another disadvantage of laser dicing semiconductor wafers is that the workpiece throughput rate is limited by the power capabilities of the laser.

The system and method described herein could also be used to monitor the parameters used to micromachine fusible links on a semiconductor wafer. A system designed to remove fusible links on a semiconductor wafer is described in U.S. Pat. No. 5,574,250 of Sun, et al, also assigned to the assignee of this patent application.

A goal of laser micromachining operations is to provide consistent quality of laser micromachined features over the entire workpiece. Some measures which define feature quality include the location, size, and shape of the feature. Further measures include sidewall angle, bottom texture, volume and texture of debris left in the feature after micromachining, and cracking near the edge of the feature, among others. One problem with laser micromachining operations as discussed herein is that, due to non-uniformities in the workpiece, performing the machining operations with the same laser parameters at two different locations on the workpiece can result in differences in feature qualities. Examples of workpiece differences that influence the results include differences in thickness, differences in workpiece flatness, and differences in surface preparation that makes the workpiece more or less reflective of laser power. These variations are not constant over the entire workpiece and can vary depending upon location down to the individual feature. Furthermore these variations can be repetitive from workpiece to workpiece in a given lot of workpieces due to normal variations in manufacturing tolerances.

Another phenomenon that affects the ability of the laser micromachining system to machine features is aging and/or damage to the optics used to direct the laser beam to the workpiece. As optical components age, they are subject to contamination, most notably from debris from the micromachining operation itself and damage from the high-power laser beams being transmitted through the optics. These and other forms of degradation can cause the laser spot projected onto the workpiece to change in size, shape, intensity or other characteristics, thereby changing the size, shape, depth, or other measures of the feature being micromachined in spite of the exact same parameters being used to control the laser beam.

Prior art systems for laser micromachining use real time controls that alter the parameters of the laser beam as the feature is being machined in an attempt to mitigate the effects of changes in the optics due to aging or damage. In some laser micromachining systems, in particular the systems referenced herein, a photodetector is used to monitor the laser power as the workpiece is being micromachined. The output from the photodetector is used to adjust the laser power in real time in an attempt to compensate for some of the sources of variability in laser power at the workpiece. This is typically accomplished by adjusting a variable attenuator in the optical path to change the laser energy transmitted by the optics to achieve a predetermined amount of energy for each machining operation. If the beam cannot be brought into agreement with a predetermined value, the operation is stopped and the operator is alerted that maintenance is required. The problem with this approach is that although it can help compensate for aging optics or other sources of variation in laser power, the fact that it is automatically compensating for possible deterioration of the laser or optics means that, unless the system is monitored, there is concealment of important information that could be used to trigger maintenance of the system before the system shuts down and valuable production time is lost.

Another issue with trying to maintain consistent quality of laser micromachined feature is that simply recording pre-selected laser parameters such as pulse repetition frequency (PRF) or pulse energy, among others, is not sufficient to characterize the laser parameters used in the micromachining process because the laser beam is typically not directed at the workpiece for the total nominal duration of the micromachining process. For instance, with the laser micromachining systems referenced herein, the laser beam is directed for a portion of the time it is pulsed onto a power meter which measures the power output of the laser beam. The system can then adjust a controllable attenuator in the optical path to cause the laser beam power to be raised or lowered to a pre-selected value. Typically this is used to compensate for reduce transmission by the optical components as they age. If the nominal laser energy value cannot be reached by adjusting the attenuator, the system generates an error signal. The problem is that unless the system is able to record the attenuator setting, the final laser power, and the number of pulses actually delivered to the workpiece, among other parameters, over the specific period of time the feature is being micromachined as opposed to being calibrated, there will exist no accurate record of the actual laser power directed at the workpiece during the micromachining of a particular feature.

Other sources of systematic, repeatable variations in laser micromachined features exist. For example, directing the laser beam to the appropriate locations on the workpiece to efficiently and effectively create multiple complex features can involve coordinating the movement of one or more subsystems, including motion control subsystems that move the workpiece and optical subsystems that move the laser beam. The combined result of these complex coordinated motions that describes the relationship between the workpiece and the laser beam is called the toolpath. The complexity of the toolpath is such that it is subject to repeatable transient behavior that affect the efficiency with which the laser beam interacts with the workpiece. Examples of the types of transient behavior that can affect the laser micromachining process include but are not limited to laser angle with respect to the workpiece and settling time. Another example of transient behavior is the change in laser pulse energy as a function of the pulsing duty cycle of the laser. Due to the toolpath layout and the dynamics beam motion, the time period between processing consecutive features can vary significantly. These delays affect the internal state of the laser, due to variations in stored energy in the lasing medium and thermal transients of optical cavity components. As a result of these laser transients, certain workpiece features may be processed with increased or decreased pulse energy, even if identical processing parameters (pulse repetition frequency, number of pulses, etc.) are applied to the feature. The result of these transient behaviors is systematic variations in feature quality despite identical laser parameter settings.

What is needed in laser micromachining features in a workpiece is, therefore, a method and system for monitoring, identifying, and optionally controlling the actual parameters used to micromachine a particular feature and storing parameter information to enable the system to retrieve the parameter information either in real time, as the feature is being machined or later, after the workpiece is complete.

SUMMARY OF THE INVENTION

An object of the present invention is, therefore, to provide a method and system for improving the quality of a laser micromachined workpiece by monitoring, identifying, and storing the laser beam parameters used in the micromachining process as the workpiece is being micromachined. These parameters can be retrieved and compared to pre-selected values to either guide further micromachining operations on the workpiece in real time or to indicate that some or all of the features micromachined in the workpiece may not meet pre-selected specifications. The stored parameters may also be combined with the results of post-micromachining inspection to modify parameters used to micromachine subsequent workpieces. The method and system of the present invention effects improvement in the quality of features laser micromachined in a workpiece by recording the actual laser parameters used to micromachine the feature.

A preferred embodiment of the system and method described herein entails monitoring and storing the parameters associated with laser processing vias and/or holes in single and multilayer workpieces. The processing can involve micromachining hundreds or thousands of vias in a single workpiece. It is desired that all of these vias have acceptable quality despite the sources of variation mentioned above. An important step in assuring quality is to record the actual parameters that were used to form a particular via. Some of the parameters associated with the laser beam include but are not limited to pulse repetition frequency, total number of pulses, pulse power, pulse energy, pulse shape, pulse width, wavelength, and tolerances associated with these parameters. In addition, other parameters associated with the laser optics and motion control include but are not limited to location, settling time, spot size and beam shape, and the tolerances associated with each. A further system parameter that needs to be recorded is the actual amount of time that the laser beam is directed to the workpiece.

Additional objects and advantages of this invention will be apparent from the following detailed description of preferred embodiments thereof, which proceeds with reference to the accompanying drawings.

DETAILED DESCRIPTION OF PREFERRED EMBODIMENTS

In a first implementation of a preferred embodiment of this invention, laser pulses generated by the invention disclosed herein form vias in single layer or multilayer workpieces by aiming a laser at least one particular areas of the workpiece with sufficient energy to remove material. It is assumed that a single pulse is insufficient to remove all of the desired material from a particular location on the workpiece. Multiple pulses are, therefore, directed to the workpiece to effect removal of the desired material at each specified location. The processing time and hence the system throughput is dependent upon the number of pulses delivered to the workpiece for each unit time at energies above the material removal threshold of the workpiece.

Figure 1:
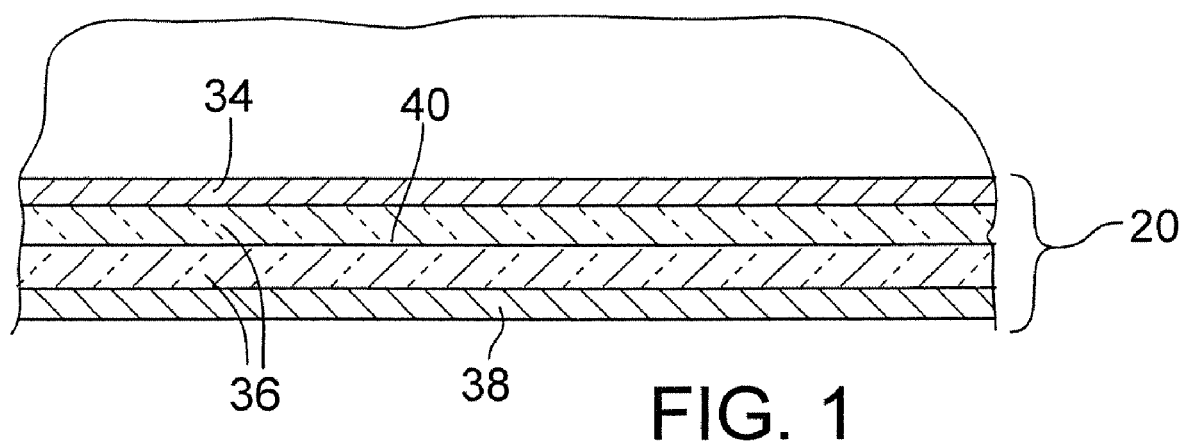
FIG. 1 is a fragmentary cross-sectional view of an exemplary multilayer workpiece of the type to be processed by a laser beam formed in accordance with the method of the present invention.

Preferred single layer workpieces include thin copper sheets; polyimide sheets for use in electrical applications; and other metal pieces, such as aluminum, steel, and thermoplastics used in general industry and medical applications, or silicon or other semiconductor materials used as substrates for building electronic circuits upon. Preferred multilayer workpieces include a multi-chip module (MCM), circuit board, or semiconductor microcircuit package. FIG. 1 shows an exemplary multilayer workpiece 20 of an arbitrary type that includes layers 34, 36, 38, and 40. Layers 34 and 38 are preferably metal layers that each include a metal, such as, but not limited to, aluminum, copper, gold, molybdenum, nickel, palladium, platinum, silver, titanium, tungsten, a metal nitride, or a combination thereof. Metal layers 34 and 38 preferably have thicknesses that are between about 9 μm and about 36 μm, but they may be thinner than 9 μm or as thick as 72 μm.

Each layer 36 preferably includes a standard organic dielectric material such as benzocyclobutane (BCB), bismaleimide triazine (BT), cardboard, a cyanate ester, an epoxy, a phenolic, a polyimide, polytetrafluorethylene (PTFE), a polymer alloy, or a combination thereof. Each organic dielectric layer 36 is typically thicker than metal layers 34 and 38. The preferred thickness of organic dielectric layer 36 is between about 20 μm and about 400 μm, but organic dielectric layer 36 may be placed in a stack having a thickness as great as 1.6 mm.

Organic dielectric layer 36 may include a thin reinforcement component layer 40. Reinforcement component layer 40 may include fiber matte or dispersed particles of, for example, aramid fibers, ceramics, or glass that have been woven or dispersed into organic dielectric layer 36. Reinforcement component layer 40 is typically much thinner than organic dielectric layer 36 and may have a thickness that is between about 1 μm and about 10 μm. Skilled persons will appreciate that reinforcement material may also be introduced as a powder into organic dielectric layer 36. Reinforcement component layer 40 including this powdery reinforcement material may be noncontiguous and nonuniform.

Skilled persons will appreciate that layers 34, 36, 38, and 40 may be internally noncontiguous, nonuniform, and nonlevel. Stacks having several layers of metal, organic dielectric, and reinforcement component materials may have a total thickness that is greater than 2 mm. Although the arbitrary workpiece 20 shown as an example in FIG. 1 has five layers, the present invention can be practiced on a workpiece having any desired number of layers, including a single layer substrate.

Figure 2:
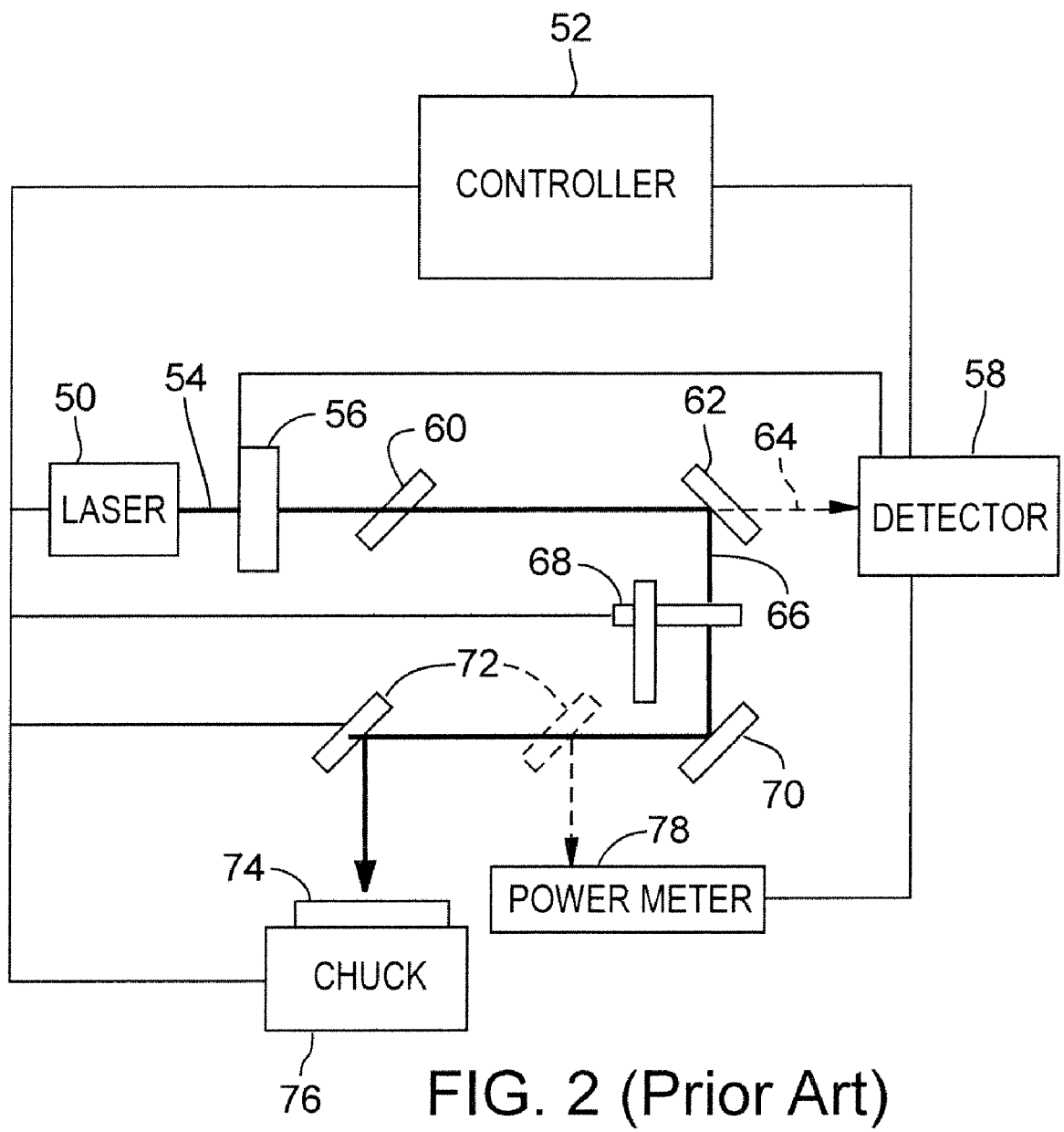
FIG. 2 is a schematic diagram of a prior art laser processing system.

FIG. 2 is a simplified schematic diagram of a prior art system comprising a laser 50 controlled by a controller 52. Controller 52 may contain a computer or be connected to a computer through an interface (not shown). Laser 50 provides at its output a processing beam 54, comprised of a laser pulse train. Laser processing beam 54 passes through a controllable variable waveplate attenuator 56, which, under the control of a pulse energy detector 58 varies the attenuation of laser processing beam 54 to try to achieve a desired power level. The attenuated laser processing beam 54 then passes through a linear polarizer 60 to a 2% transmitting mirror 62. The 2% transmitting mirror 62 reflects 98% of the laser processing beam power and allows 2% of laser processing beam power 64 to be transmitted to pulse energy detector 58, which measures the pulse energy of the 2% laser processing beam 64 and calculates the pulse energy available in the reflected 98% laser processing beam 66. Pulse energy detector 58 compares the calculated pulse energy to a preselected pulse energy value and attempts to resolve the difference by directing controllable variable waveplate attenuator 56 to change the amount of attenuation applied to laser processing beam 54. Pulse energy detector 58 also transmits information to controller 52. Reflected 98% laser processing beam 66 then passes through a shutter 68, which acts to either stop the laser beam or allow it to pass under command from controller 52. Reflected 98% laser processing beam 66 is then turned by a turning mirror 70 and thereby directed to a moveable mirror 72 which, under command from controller 52 directs the beam either to a workpiece 74, which is attached to a chuck 76 or a chuck power meter 78. When moveable mirror 72 directs reflected 98% laser processing beam 66 onto chuck power meter 78, it measures reflected 98% laser processing beam 66 power and transmits the result to pulse energy detector 58 and subsequently to controller 52. Chuck 76, under command of controller 52 moves workpiece 74 to direct reflected 98% laser processing beam 66 to various points on workpiece 74. Not shown in this simplified diagram are optional beam steering optics that optionally direct reflected 98% laser processing beam 66 to various points on workpiece 74.

Figure 3:
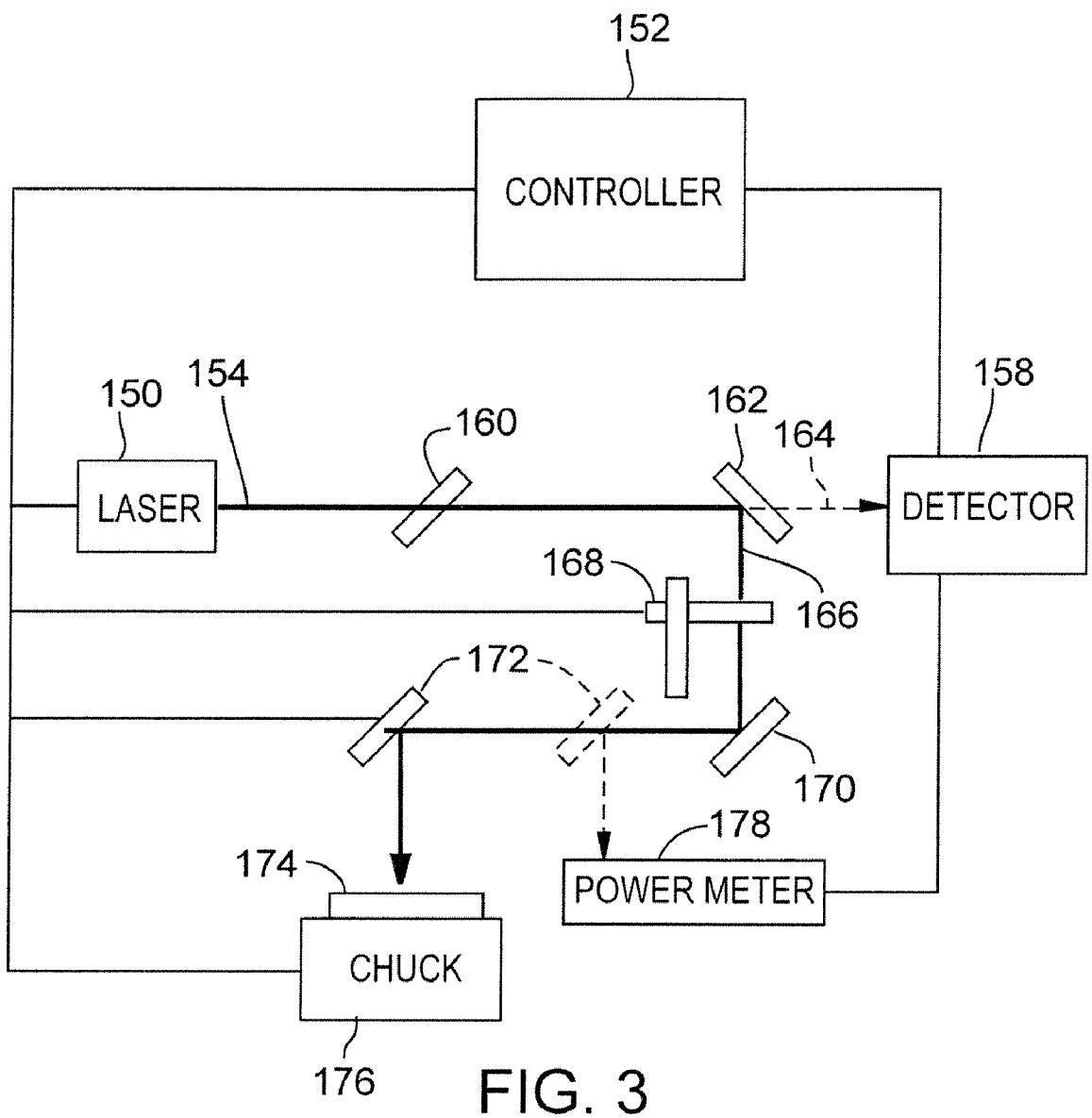
FIG. 3 is a schematic diagram of a preferred embodiment of a preferred system for implementing a preferred method described herein.

FIG. 3 is a simplified schematic diagram of a preferred embodiment of the method and system described herein comprising a laser 150 controlled by a controller 152. Controller 152 may contain a computer or be connected to a computer through an interface (not shown). Laser 150 provides at its output a processing beam 154, comprised of a laser pulse train. Laser processing beam 154 passes through a linear polarizer 160 to a 2% transmitting mirror 162. The 2% transmitting mirror 162 reflects 98% of the laser processing beam power and allows 2% of the laser processing beam power 164 to be transmitted to a pulse energy detector 158, which measures the pulse energy of the 2% laser processing beam and calculates the pulse energy available in the reflected 98% laser processing beam 166. Pulse energy detector 158 compares the calculated pulse energy to a preselected pulse energy value and attempts to resolve the difference by directing controller 152 to change the parameters controlling laser 150 to change the power of laser processing beam 154. Some of the laser parameters that the controller can change to alter the power of laser processing beam 154 include, but are not limited to, pulse request, pump energy, radio frequency Q-switch time or level. Reflected 98% laser processing beam 166 then passes through a shutter 168, which acts to either stop the laser beam or allow it to pass under command from controller 152. Reflected 98% laser processing beam 166 is then turned by turning mirror 170 and thereby directed to a moveable mirror 172 which, under command from controller 152, directs the beam either to a workpiece 174, attached to a chuck 176 or a chuck power meter 178. When moveable mirror 172 directs reflected 98% laser processing beam 166 onto chuck power meter 178, it measures reflected 98% laser processing beam 166 power and transmits the result to pulse energy detector 158 and subsequently to controller 152. The reason that two energy measuring devices are used is that chuck power meter 178 is more accurate than pulse energy detector 158 but the latter can be used to monitor the process while reflected 98% laser processing beam 166 is micromachining the workpiece. Thus chuck power meter 178 can be used to set the laser power, and pulse energy detector 158 can be used to verify that it is constant during the micromachining operation. Chuck 176, under command of controller 152, moves workpiece 174 to direct the reflected 98% laser processing beam 166 to various points on workpiece 174. Not shown in this simplified diagram are optional beam steering optics that optionally direct reflected 98% laser processing beam 166 to various points on workpiece 174.

Processing laser 150 may be a UV laser, an IR laser, a green laser, or a $CO_2$ laser. A preferred processing laser output has a pulse energy that is between about 0.01 μJ and about 1.0 J. A preferred UV processing laser is a Q-switched UV DPSS laser including a solid-state lasant such as Nd:YAG, Nd:YLF, Nd:YAP, or Nd:YVO4, or a YAG crystal doped with ytterbium, holmium, or erbium. The UV laser preferably provides harmonically generated UV laser output at a wavelength such as 355 nm (frequency tripled Nd:YAG), 266 nm (frequency quadrupled Nd:YAG), or 213 nm (frequency quintupled Nd:YAG).

A preferred $CO_2$ processing laser is a pulsed $CO_2$ laser operating at a wavelength of between about 9 μm and about 11 μm. An exemplary commercially available pulsed $CO_2$ laser is the Model Q3000 Q-switched laser (9.3 μm) manufactured by Coherent-DEOS of Bloomfield, Conn. Because $CO_2$ lasers are unable to effectively drill vias through metal layers 34 and 38 of multilayer workpiece 20 multilayer workpieces drilled with $CO_2$ processing lasers either lack metal layers 34 and 38 or are prepared such that a target location has been pre-drilled with a UV laser or pre-etched using another process such as, for example, chemical etching, to expose dielectric layer 36. Skilled persons will appreciate that other solid-state lasants or $CO_2$ lasers operating at different wavelengths may be used in the laser system of the present invention. Various types of laser cavity arrangement, harmonic generation of the solid state laser, Q-switch operation for both the solid-state laser and the $CO_2$ laser, pumping schemes, and pulse generation methods for the $CO_2$ laser are well known to those skilled in the art.

The preferred embodiment described operates by monitoring and storing the parameters used to laser micromachine a feature in a workpiece. In the preferred embodiment, the system has stored pre-selected values for the parameters to be used to form vias in the workpiece. In the first mode of operation, the system proceeds with the via formation process, storing an identifier that identifies the location at which the first via was directed to be formed and storing along with the identifier the laser parameters to be used to micromachine that via. The system additionally monitors the laser power to ensure that the desired laser power is delivered to the workpiece by measuring the pulse energy with the pulse energy detector 158 and the chuck power meter 178 as described above. As adjustments are made to the laser parameters to maintain a desired laser power, the adjusted parameters are stored along with the current identifier. The system then proceeds to micromachine the next via, storing a second identifier and second set of parameters. The system then proceeds to the next via, storing a next identifier and next set of parameters and so forth until all of the desired micromachining operations have been performed on the workpiece.

Once the workpiece is micromachined, the stored values can be used for at least three purposes. First, the parameters can be retrieved and examined to determine how the laser power has been adjusted during the micromachining operations. Changing laser parameters can indicate that conditions such as drift in control electronics or damage to optical elements are changing and can alert operators of the system to schedule maintenance to be performed on the system. Thus the system can be adjusted or aging components replaced before they go out of tolerance and shut down the system during production. This application is generally known as statistical process control (SPC), wherein data from a manufacturing process is analyzed to predict when the process might go out of tolerance and begin manufacturing products that do not have the desired properties. The data generated by the method and system disclosed herein provide more accurate data and therefore better results from SPC than those achieved in the prior art.

Another use for these stored parameters is to examine and use them to predict where the system may have had problems micromachining high quality vias. For example, if the parameter set shows that the system may have needed more laser power than that which was available, the vias formed with these parameters may, therefore, not have had sufficient material removed. This could be caused by deterministic properties of the tool path. Based on the analysis of the saved and restored parameters, the workpiece may be rejected or re-worked. The third application of this method is to combine it with post-micromachining inspection of some type to assess the performance of the parameters being used. In this example, forming vias is referred to as drilling, and one of the parameters that expresses the total time necessary to form the via is referred to as tdrill, which is measured in seconds and is calculated by the formula:

$$tdrill = (\text{number of pulses})/(\text{pulse repetition frequency})$$

The goal is to achieve quality features, in this case vias, in the shortest time period to yield the greatest throughput for the system. Noting that the power per pulse, and thus the amount of material removed for each pulse is inversely related to the pulse repetition frequency (PRF), a maximum PRF can be selected that will result in effective material removal. The user then selects the number of pulses that will complete the material removal by relying on experience with the specific materials to be removed and the laser to be used. Upon inspecting the results of a completed workpiece, the number of pulses or the PRF can be changed for those specific features or groups of features that show evidence of too little or too much material removal.

The identified parameter file can also be used in real time to effect changes in the quality of the features being micromachined. In this case, the identified parameters are examined immediately upon completion of the feature. The goal is to detect parameters that the system changed in the course of micromachining the feature and that could cause a change in the quality of the feature. For example, if the system altered the laser power due to changes detected by the pulse energy detector during micromachining, the system can either mark the feature as possibly being over machined or have the system use more pulses to complete the machining, depending upon the change in power.

Another preferred embodiment of this invention is directed towards semiconductor wafer dicing. In this application multiple circuit elements or devices are constructed on a single substrate. An example of this is a semiconductor wafer in which multiple, identical semiconductors devices are created using photolithographic processes on a single silicon wafer. Prior to packaging these devices for use, the wafer needs to be diced, an operation in which the wafer is cut so the individual devices are separated from one another. This operation is increasingly being performed by lasers in a micromachining operation in which delivering the appropriate number of appropriately powered laser pulses to the workpiece for each unit time at the correct locations achieves a high quality separation of the wafer. In this case, the feature to be micromachined may be a cut or kerf that extends the entire width or length of the wafer, but the requirements for maintaining accurate laser power and delivering the correct number of laser pulses for each unit time are similar to the application described above. This application would, therefore, benefit from the same type of monitoring of the laser parameters in the same fashion as that for the application described herein.

A third preferred embodiment of this invention is directed towards fusible link removal. In this application, conductive links are constructed on a semiconductor wafer containing integrated circuits. The link or links connect active circuit elements. After a majority of processing steps have been accomplished but before the semiconductor wafer is diced and packaged, the link removal system is directed to remove one or more links at specific locations. The purpose of removing the links is to remove defective elements from the active circuits and/or add elements to the circuit. Fusible link structures can also be used to tune, serialize, or otherwise identify the semiconductor circuits. Removal of fusible link material requires that sufficient laser power over the correct time period be delivered to the link area to cause all of the link material be cleanly removed, since any remaining debris could provide a path for current to flow and defeat the purpose of having removed the link. Directing too much power to the link area, on the other hand, could damage surrounding or underlying circuit structures. Thus it is important for link removal system to accurately monitor laser beam pulse parameters in order to ensure consistent, high quality link removal.

It will be obvious to those having skill in the art that many changes may be made to the details of the above-described embodiments of this invention without departing from the underlying principles thereof. The scope of the present invention should, therefore, be determined only by the following claims.

What is claimed is:

1. A method of providing information regarding features micromachined into a workpiece using laser beam pulses controlled by a programmable controller, the features characterized by one or more specifications; the workpiece including one or more layers, each layer characterized by a material type and thickness; the laser beam pulses characterized by one or more preassigned parameters and optically associated with one or more detectors operatively connected to the programmable controller; the programmable controller operatively connected to a processor to process data including one or more of the preassigned laser beam pulse parameters, preassigned feature specifications, and preassigned workpiece characteristics; and the programmable controller operable to modify the laser beam pulse parameters based on information acquired from the one or more detectors and information acquired from the processor, comprising:

acquiring with a detector operatively associated with the laser beam pulses data corresponding to one of the laser beam pulse parameters used during micromachining of a particular feature of and at a particular location on the workpiece;

storing the laser beam pulse parameter data acquired during the micromachining of the particular feature;

associating the stored laser beam pulse parameter data acquired with a corresponding one of the preassigned laser beam pulse parameters, the preassigned feature specifications, and the preassigned workpiece characteristics of the particular feature micromachined; and determining from the association whether there has occurred an operational change in the laser beam pulses that would impact a specified quality of the feature.

2. The method of claim 1 wherein the preassigned laser beam pulse parameters include one or more of type, size, pulse repetition rate, number of pulses, pulse shape, pulse width, pulse energy, peak pulse power, pulse energy tolerance, settling time, spot size, beam shape, or wavelength.

3. The method of claim 1 wherein the preassigned feature specifications include one or more of type, location, depth, shape, size, diameter, or allowable debris left after micromachining.

4. The method of claim 1 wherein the workpiece characteristics include one or more of the number and order of layers and the material or materials comprising each layer.

5. The method of claim 1 wherein the acquired parameter data are used for statistical quality control.

6. The method of claim 1 wherein the acquired parameter data are used to indicate the particular micromachined feature may have measurements that do not conform to a corresponding one of the preassigned feature specifications.

7. The method of claim 1 wherein the acquired parameter data associated with the particular micromachined feature are used to allow the programmable controller to direct additional laser beam pulses at the particular micromachined feature to perform additional micromachining.

8. The method of claim 1 wherein the laser beam pulse parameter data acquired with a corresponding one of the preassigned feature specifications, the preassigned workpiece characteristics, and the preassigned laser beam pulse parameters are used to modify the laser beam pulse parameters used to micromachine one of the features.

9. The method of claim 1 wherein the acquired parameter data are used by the programmable controller to modify the parameters used to micromachine subsequent workpieces.

10. The method of claim 1 wherein the workpiece being micromachined is a printed wiring board comprising one or more layers of dielectric or conductive material of various thicknesses.

11. The method of claim 1 wherein one of the features being micromachined is a substantially circular hole through one or more layers of the workpiece.

* * * * *